(12) United States Patent
Wieschemann et al.

(10) Patent No.: US 11,338,687 B2
(45) Date of Patent: May 24, 2022

(54) CHARGING STATION FOR A CONTAINER TRANSPORT VEHICLE, CONTAINER TRANSPORT VEHICLE, AND SYSTEM COMPRISING SAME

(71) Applicant: Konecranes Global Corporation, Hyvinkää (FI)

(72) Inventors: Armin Wieschemann, Oberhausen (DE); Heiko Schulz, Leverkusen (DE); Jan-Philipp Schmidt-Ewig, Essen (DE); Stefan Aldejohann, Langenfeld (DE); Heinz Eichner, Ratingen (DE)

(73) Assignee: Konecranes Global Corporation, Hyvinkää (FI)

( * ) Notice: Subject to any disclaimer, the term of this patent is extended or adjusted under 35 U.S.C. 154(b) by 40 days.

(21) Appl. No.: 16/484,939

(22) PCT Filed: Feb. 14, 2018

(86) PCT No.: PCT/EP2018/053711
§ 371 (c)(1),
(2) Date: Aug. 9, 2019

(87) PCT Pub. No.: WO2018/149886
PCT Pub. Date: Aug. 23, 2018

(65) Prior Publication Data
US 2020/0001733 A1   Jan. 2, 2020

(30) Foreign Application Priority Data
Feb. 15, 2017   (DE) .......................... 102017103032.8

(51) Int. Cl.
*H02J 7/00*       (2006.01)
*B60L 53/14*      (2019.01)
(Continued)

(52) U.S. Cl.
CPC ............... *B60L 53/14* (2019.02); *B60L 53/16* (2019.02); *B60L 53/30* (2019.02); *H02J 7/0027* (2013.01); *H02J 7/0042* (2013.01)

(58) Field of Classification Search
CPC .............................. B60L 53/14; H02J 7/0042
(Continued)

(56) References Cited

U.S. PATENT DOCUMENTS 7,619,319 B1 * 11/2009  Hunter ................... B60L 53/57
                                                  290/4 R
8,875,826 B2 * 11/2014  Franzen .................. B66F 9/063
                                                  180/68.5
(Continued)

FOREIGN PATENT DOCUMENTS

AT        507605       2/2014
CH        699574       3/2010
(Continued)

OTHER PUBLICATIONS

International Preliminary Examination Report on Patentability in English from corresponding Patent Cooperation Treaty (PCT) Application No. PCT/EP2018/053711, dated Feb. 18, 2019.
(Continued)

*Primary Examiner* — Suchin Parihar
(74) *Attorney, Agent, or Firm* — Gardner, Linn, Burkhart & Ondersma LLP

(57) ABSTRACT

A charging station for a container transport vehicle includes a charging device and a contacting unit connected thereto, to establish a connection between the charging station and contacts of a rechargeable battery of a container transport vehicle for battery charging process. The charging station, including the contacting unit and the charging device, is designed as a mobile unit. The contacting unit and the charging device are arranged in a housing, and the housing
(Continued)

has an opening through which the contacting unit can be moved for a charging process. Optionally, battery contacts and a funnel-shaped guide are provided, and the contacts are arranged near the guide such that a contacting unit of the charging station can be guided to the battery contacts, by the guide, for a battery charging process. The disclosure also relates to a system including a charging station and a container transport vehicle.

17 Claims, 3 Drawing Sheets

(51) Int. Cl.
  *B60L 53/16* (2019.01)
  *B60L 53/30* (2019.01)
(58) Field of Classification Search
  USPC .......................................................... 320/109
  See application file for complete search history.

(56) References Cited

U.S. PATENT DOCUMENTS

| | | | | |
|---|---|---|---|---|
| 8,996,159 | B2 | 3/2015 | Franzen et al. | |
| 2011/0025267 | A1* | 2/2011 | Kamen | H02J 7/0027 |
| | | | | 320/109 |
| 2011/0055037 | A1* | 3/2011 | Hayashigawa | B60L 55/00 |
| | | | | 705/26.1 |
| 2013/0057209 | A1* | 3/2013 | Nergaard | B60L 53/63 |
| | | | | 320/109 |
| 2014/0017045 | A1* | 1/2014 | Wieschemann | B60K 1/04 |
| | | | | 414/460 |
| 2014/0292260 | A1* | 10/2014 | Dyer | B60L 53/665 |
| | | | | 320/107 |
| 2015/0367741 | A1* | 12/2015 | Ko | H02J 50/10 |
| | | | | 307/10.1 |
| 2016/0352113 | A1* | 12/2016 | Zhao | B60L 53/35 |
| 2017/0282736 | A1* | 10/2017 | Goei | B60L 53/62 |
| 2019/0351783 | A1* | 11/2019 | Goei | G05B 13/0265 |

FOREIGN PATENT DOCUMENTS

| | | |
|---|---|---|
| DE | 202011100803 | 7/2011 |
| DE | 102012108768 | 3/2014 |
| EP | 2440488 | 4/2012 |
| WO | 2009053524 | 4/2009 |
| WO | 2009150303 | 12/2009 |
| WO | 2010142688 | 12/2010 |
| WO | 2012011436 | 1/2012 |
| WO | 2013050447 | 4/2013 |
| WO | 2013100764 | 7/2013 |
| WO | 2014184729 | 11/2014 |
| WO | 2016203383 | 12/2016 |

OTHER PUBLICATIONS

International Search Report and Written Opinion of the International Searching Authority from corresponding Patent Cooperation Treaty (PCT) Application No. PCT/EP2018/053711, dated May 25, 2018.
International Preliminary Examination Report from corresponding Patent Cooperation Treaty (PCT) Application No. PCT/EP2018/053711, transmitted Feb. 18, 2019.

* cited by examiner

CHARGING STATION FOR A CONTAINER TRANSPORT VEHICLE, CONTAINER TRANSPORT VEHICLE, AND SYSTEM COMPRISING SAME

CROSS REFERENCE TO RELATED APPLICATIONS

The present application is a § 371 national stage of International Application PCT/EP2018/053711, filed Feb. 14, 2018, which claims priority benefit of German Pat. Application DE 10 2017 103 032.8, filed Feb. 15, 2017.

FIELD OF THE INVENTION

The invention relates to an electric charging station for a container transport vehicle, such as of the type that may be used in a port terminal.

BACKGROUND

Container transport vehicles are ground conveyor vehicles which are designed as heavy-duty vehicles and are configured for handling and/or transporting containers in specific terminals, in particular port terminals. Such containers, in particular in the case of ISO containers in the loaded state, can weigh up to 40 t and can have normed or at least standardised lengths of e.g. 10, 20, 40, 45, 53 or 60 foot (the two last-named lengths have hitherto been used exclusively in North America as non-ISO-normed containers). In conjunction with this, ISO containers are understood to be normed large-volume or sea-freight containers which are used in the international transportation of goods. In the terminals, corresponding containers are handled between at least two transport means of the same or different type, e.g. between ships, road vehicles and/or rail vehicles. Therefore, correspondingly combined transportation between water, road and/or rail can also take place in the terminals. In this connection, containers can also be other normed or at least standardised load carriers, such as e.g. swap bodies, in particular swap containers or swap trailers.

Such container transport vehicles are special ground-borne but not rail-borne vehicles which are operated only internally within such terminals and are generally not authorised for use on public roads. Therefore, these internal container transport vehicles are to be operated strictly separately from vehicles on public roads. A possible vehicle type of such container transport vehicles has a loading surface which is delimited by mutually spaced-apart guide elements. The guide elements are also referred to as position adapters and guide a container to be picked up or its corner fittings onto the loading surface. For this purpose, the guide elements extend with their guide surfaces inclined outwardly and upwards away from the loading surface. In this case, the loading surface can also be designed as part of a lifting platform which can be raised and lowered. Such container transport vehicles are known e.g. from EP 2 637 954 B1. A towing vehicle which is referred to as a terminal truck or terminal tractor can also form, in its own right or together with one or a plurality of trailers as a type of trailer truck, a vehicle type of container transport vehicles in terms of the present invention. Their loading surface and guide elements for picking up the load carriers are then provided in each case on the trailer(s). Such container transport vehicles are known e.g. from DE 10 2012 108 768 A1. Gantry lift devices also represent a vehicle type of container transport vehicles in terms of the present invention. This vehicle type is described e.g. in EP 2 694 424 B1. Such gantry lift devices, which are also called gantry lift stacker trucks, gantry stacking trucks, straddle carriers, van carriers, shuttle carriers or runners, are used not only for container transport in horizontal transportation but are also used in particular as special handling devices for ISO containers. With the aid of a lifting device and a load picking-up means known as a spreader, gantry lift devices can lift containers and set them down at a target location after transportation. Since the gantry lift devices have a spider leg-like construction, they can travel over a container resting on the ground or on another container and thus additionally also transport a raised container depending on construction. In dependence upon the construction height, the gantry lift devices are designated e.g. as 1-over-3 devices, 1-over-2 devices etc. A 1-over-3 device can set a container down on 3 stacked containers, pick up the uppermost one of 4 stacked containers or travel over 3 stacked containers with a picked-up container.

The aforementioned container transport vehicles used within a terminal can be guided manually and can be actively controlled accordingly in particular during acceleration, braking and steering by drivers typically also travelling in the vehicles. For this purpose, manually guided container transport vehicles have a corresponding vehicle controller and typically also a driver's cabin, from which manual engagement of the vehicle controller can be effected for the purpose of manual guiding. Alternatively, the container transport vehicles can also be automatically guided and can be controlled in an automated manner accordingly in particular during acceleration, braking and steering in terms of so-called automated guided vehicles (AGV). For this purpose, automatically guided container transport vehicles have a suitable vehicle controller and so, by reason of the automatic control or navigation effected thereby, it is not necessary or possible for a driver also travelling in the vehicle to perform any active manual engagement. In this sense, an automatically guided container transport vehicle can also be manned if a driver also travels in the vehicle, but in this case not in the sense of having to or being able to actively engage the controller of the container transport vehicle as a vehicle driver. Container transport vehicles which are driverless but are manually remote-controlled by a vehicle driver are not deemed to be automatically guided vehicles but instead are deemed to be manually guided vehicles.

WO 2013/050447 A2 describes a gantry crane which serves as an electric charging station for container transport vehicles. Loading can be performed inductively or even by means of cables.

WO 2009/150303 A1 discloses a power supply station for supplying power to electrically operated straddle carriers or terminal trucks.

Electric charging stations are known from documents US 2013/057209 A1, WO 2013/100764 A1, WO 2009/053524 A1, US 2015/0367741 A1, U.S. Pat. No. 7,619,319 B1, WO 2012/011436 A1, WO 2016/203383 A1, US 2011/0055037 A1 and WO 2014/184729 A2. AT 507 605 B1 discloses an electric charging station system for electric vehicles, in which each driver of an electric vehicle must keep safe and carry a user module in order to connect it for a charging procedure as a type of docking station to the charging device of the electric charging station.

EP 2 440 488 B1 or WO 2010/142688 A1 discloses a corresponding container transport vehicle comprising a battery-electric travel drive which comprises a chargeable lead battery as a traction battery. Moreover, this document describes a battery changing station, in which the battery from the container transport vehicle can be replaced by an already charged battery. The battery changing station also has a charging and storing function and so in the station a plurality of removed batteries can be charged outside the container transport vehicle and can be placed into storage until the next battery change.

EP 2 694 424 B1 describes that the battery of a straddle carrier can be exchanged for an already charged battery for a charging procedure outside the straddle carrier.

In order to avoid a change of batteries and instead to be able to leave the battery in the container transport vehicle during the charging procedure, a charging station at which the container transport vehicle can stop for the purpose of a charging procedure can be installed in a terminal. The manufacturer Kalmar provides a charging station for straddle carriers under the name "FastCharge" (see https://www.kalmarglobal.com/fastcharge). The charging station comprises a mast, by which a contacting unit is elevated and movably mounted. The contacting unit is supplied with electric power via a cable guided up the mast. For a charging procedure, a straddle carrier stops in the region of the charging station and so the contacting means can be moved away from the mast in the direction of a top frame of the straddle carrier in order to be able to be connected to contact means of the straddle carrier, which are arranged on the top frame, for the charging procedure. Then, by means of the contact means connected to a battery of the straddle carrier the battery is charged at the charging station via its contacting unit.

SUMMARY OF THE INVENTION

The present invention provides an improved electric charging station, an improved container transport vehicle and a system therewith which permit particularly economical and flexible operation.

In accordance with one form of the invention, an electric charging station is provided for a container transport vehicle, wherein the electric charging station comprises a charging device and a contacting unit which is connected thereto and via which a connection between the electric charging station and contact means of a chargeable battery of a container transport vehicle can be established for a charging procedure of the battery, wherein the electric charging station including the contacting unit and the charging device is designed as a mobile unit, is improved by virtue of the fact that, in order to design the electric charging station as a mobile unit, the contacting unit and the charging device are arranged in a housing and the housing has an opening, through which the contacting unit can be moved out of the housing for a charging procedure. The combination of the electric charging station components to form a mobile unit ensures that the installation site of a thus transportable electric charging station can be easily changed upon requirement. In this connection, the electric charging station can be arranged e.g. in a structurally simple manner on a vehicle trailer and can be moved accordingly thereby. It may become necessary to change the installation site e.g. during structural alteration works in a terminal or during area rehabilitation work at this location. A further advantage arises from the fact that the electric charging station components can be fully constructed and tested prior to delivery to the mobile unit and this is no longer necessary after the delivery. Instead, after delivery, only the connection to the local power supply network is required. Furthermore, the use of such an electric charging station module requires only very small levels of investment in the infrastructure at the installation site, e.g. in a port terminal. In this connection, it is only necessary to ensure a connection option to the local power supply network. Optionally, a network connection for data transmission can additionally also be provided as part of the communication described below between the terminal management system or fleet management system and the electric charging station. Also, in comparison with fixedly installed electric charging stations in terms of charging stations, the installation outlay at the installation site is lower. Furthermore, the infrastructure outlay for installing a mobile electric charging station in accordance with the invention is also considerably lower than for setting up the battery changing station for lead batteries which is known from the prior art. In contrast to the aforementioned prior art, the electric charging station in accordance with the invention does not require the permanent construction of any building, heavy-duty rack or even a rack serving apparatus for the exchange of batteries. Since, in the event of a failure of the rack serving apparatus of a battery changing station, not all of the stored batteries are available, it is frequently the case that two battery changing stations are constructed in order to ensure sufficient redundancy. In contrast thereto, redundancies to avoid an operating failure of container transport vehicles can be achieved with considerably lower outlay by installing a plurality of electric charging stations in accordance with the invention. These advantages have an even greater effect if the electric charging station is configured for charging lithium-ion batteries and accordingly the container transport vehicles are equipped with correspondingly designed batteries in order to be powered thereby. This results from the fact that lithium-ion batteries can be charged more quickly than lead batteries and therefore the duration for which a container transport vehicle is removed from the normal transport operation by reason of the charging procedure can be reduced and, associated with this, the electric charging station is available more quickly for the next container transport vehicle.

In one aspect, the contacting unit can dock in an automated manner with a container transport vehicle which stops in the region of the electric charging station in order to charge its battery. In principle, it is also possible for a driver to manually move the contacting unit for docking purposes.

In another aspect, provision is made in a structurally simple manner that, in order to design the electric charging station as a mobile unit, the contacting unit and the charging device and possible further components are arranged on a common carrier element and as a result can be transported together between different installation sites. The carrier element can be formed e.g. by a vehicle trailer or its loading surface.

In another aspect, provision is made so that, in order to design the electric charging station as a mobile unit, the contacting unit and the charging device are arranged in a housing. Preferably, the housing is designed in this case as a container, in particular as an ISO container. Therefore, the electric charging station components are structurally combined by the housing likewise serving as a carrier element and as a result can be handled in a particularly easy manner and can be transported in a particularly cost-effective manner to different installation sites. This applies in particular in the case of an ISO container having normed corner fittings, by means of which simple fixing is also possible during transport and on the floor of the installation site, in that locking means in the form of so-called twistlocks are used. Preferably, all of the components are accommodated completely in the common housing. Furthermore, it is also advantageous that the installation of a housing, in particular a container or ISO container, does not require any special foundation and instead just a planar installation surface is sufficient.

Optionally, provision is made that the housing has an opening, through which the contacting unit can be moved for a charging procedure. In an advantageous manner, the contacting unit can be moved automatically through the opening of the housing. Conversely, the contacting unit can also be retracted completely into the housing through the opening. As a result, it is possible to safely pass the electric charging station without the risk of a collision between the container transport vehicle and the contacting unit.

In an advantageous manner, provision is made that as a further component a connector is provided which is connected to the charging device for the purpose of connecting the charging device to an electric power supply network and/or a control unit for activating the charging device and the contacting unit and for incorporation into a fleet management system. The connection to the power supply network can also be established, as described below, indirectly via a transformer station.

A container transport vehicle comprising a battery-electric travel drive which comprises a chargeable battery is improved by virtue of the fact that contact means of the battery and a guide, in particular in the form of a funnel, are provided and the contact means are arranged in the region of the guide such that, for a charging procedure of the battery, a contacting unit of an electric charging station can be guided to the contact means by means of the guide. This permits particularly secure and reliable docking of the contacting unit with the container transport vehicle. In this case, the battery is preferably a lithium-ion battery because in an advantageous manner they can be recharged considerably more quickly than lead batteries. As a result, it is particularly economical to perform the charging of the batteries in particular in an automated manner in the container transport vehicles which in the meantime are not available for the normal or regular transport operation in the terminal.

In an advantageous manner, provision is made for the container transport vehicle to be designed as an automatically guided container transport vehicle.

A system comprising at least one electric charging station for a container transport vehicle and at least one container transport vehicle is improved by virtue of the fact that the electric charging station and the container transport vehicle are designed as described in the present case. In an advantageous manner, such a system can be part of a terminal described in greater detail below, in particular a terminal for handling load carriers, such as e.g. ISO containers. In this case, instead of a battery changing station a plurality of electric charging stations are set up at or in the terminal. The number of electric charging stations can be ascertained taking into consideration the charging time for the batteries and the usage times between the charging procedures and the number of container transport vehicles used at maximum capacity. Should an individual electric charging station fail or be undergoing maintenance work, the fleet of container transport vehicles can be operated via the remaining electric charging stations. Therefore, in comparison with the solution comprising a battery changing station, there is considerably higher redundancy and thus greater safeguarding against failure.

Provision is made in an advantageous manner that a terminal is established, in which the at least one container transport vehicle can be operated and in which a plurality of alternative installation sites are provided, at which the at least one electric charging station can be connected to an electric power supply network of the terminal.

In a structurally simple manner, provision is made that the container transport vehicle and the electric charging station are each connected via a communication connection to a management system, in particular a terminal management system and/or a fleet management system in order to coordinate the operation of the container transport vehicle and the electric charging station.

These and other objects, advantages and features of the invention will become apparent upon review of the following specification in conjunction with the drawings.

BRIEF DESCRIPTION OF THE DRAWINGS

An exemplified embodiment of the invention is explained in greater detail with reference to the following description. In the figures.

DESCRIPTION OF THE PREFERRED EMBODIMENTS

Figure 1:
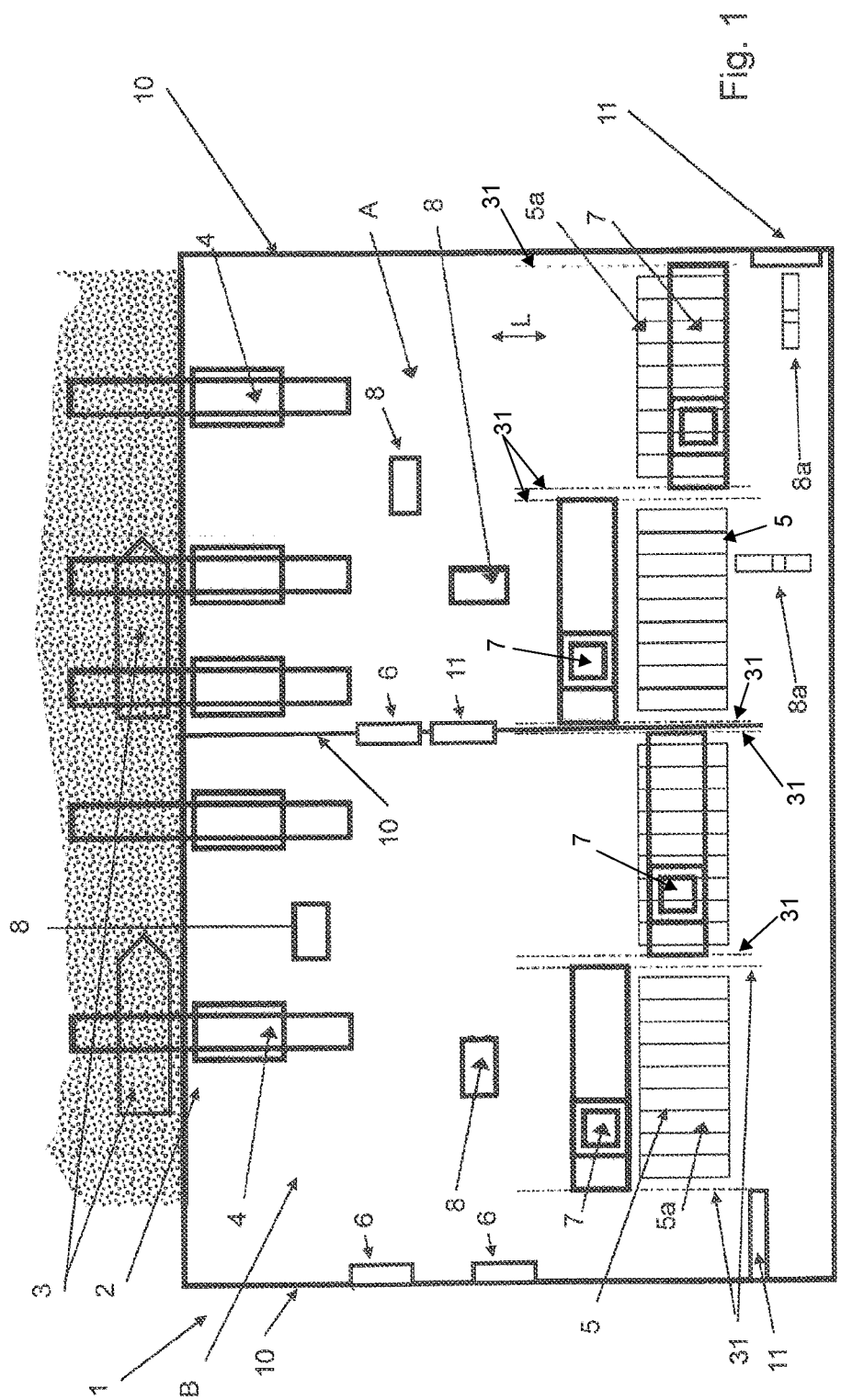
FIG. 1 shows a schematic view of a terminal for handling containers with container transport vehicles in accordance with the invention.

FIG. 1 shows a schematic plan view of a terminal 1, designed as a port terminal, for handling containers. In this case, a plurality of ships 3 can dock at a quay 2 of a port in order to deliver or collect containers. In order to load or unload the ships 3, the quay 2 is provided with container bridges 4 which are also defined as ship-to-shore cranes and of which the jibs extend, on the one hand, over the ships 3 and, on the other hand, over the quay 2. Alternatively, the loading or unloading of the ships 3 can also be performed using so-called harbor cranes, of which the jib is pivoted in this case over the corresponding ship 3 about a vertical axis. Both the container bridges 4 and the harbor cranes represent so-called handling devices.

The terminal 1 is surrounded by a boundary 10 formed as a fence or wall and is separated thereby from its outer surrounding area and from public road traffic outside the container terminal 1. Moreover, the terminal 1 comprises within the boundary 10 a container store 5, in which containers can be stacked for short-term intermediate storage in at least one storage area 5a, which is also defined as a stack, after they have been unloaded from the ships 3 and before they are loaded for further transport onto a road vehicle or rail vehicle or after they have been delivered by the vehicles and before they are loaded onto the ships 3. In this case, preferably a plurality of storage areas 5a are provided in a row-like arrangement and/or grid-like arrangement. In order to manage the container store 5, i.e. for placing/removing the containers into/out of storage in the container store 5 or its storage areas 5a, at least one stacking crane 7 is provided for all of the storage areas 5a in an adjacent transverse arrangement to the longitudinal direction L. In each storage area 5a, the associated stacking crane 7 can be used for placing down a plurality of rows of containers with their long sides next to one another and for each row a plurality of containers on top of one another. For this purpose, each stacking crane 7 is designed preferably as a gantry crane and has a load picking-up means or apparatus for the containers which is designed as a spreader frame. In order to place/remove containers into/out of storage, the stacking crane 7 can be moved in the longitudinal direction L along the associated storage area 5a over the containers stacked therein. Such stacking cranes 7 likewise represent handling devices and, in the exemplified embodiment shown in FIG. 1, are designed as automated and rail-borne stacking cranes which are also defined as automated stacking cranes or ASC for short. In the case of such an ASC terminal, the containers are set down for removal from storage or are picked up for placing into storage by the ASC on the head side at both longitudinal ends—pointing in the longitudinal direction L—of the associated storage area 5a. The ASC moves between the head-side ends via a pair of rail tracks 31, between which the respective storage area 5a is located. In the case of an ASC terminal, the movement of internal vehicles for container transportation occurring water-side or quay-side in relation to the container store 5 is separated from the land-side traffic of external vehicles by the container store 5. Accordingly, no movement of these vehicles is possible in the region of the rail tracks between the storage areas 5a. In the present case, external vehicles are understood to be external lorries 8a which travel via a passing area 11, located in the boundary 10, into and out of the terminal 1 in order to collect containers from the container store 5 or its stacking crane 7 for further transport on public roads or, after transport on public roads, to deliver the containers for intermediate storage in the container store 5.

In contrast to the layout of the terminal 1 illustrated in the present case, it is also feasible to have a layout rotated by 90 degrees in relation to the quay 2, in which accordingly the storage areas 5a do not extend in particular substantially transversely and perpendicularly but instead extend in parallel with the edge of the quay 2. This applies in particular if the stacking cranes 7 are designed as rubber-tyred stacking cranes which are also referred to as rubber-tyred gantry cranes or RTG for short, or are designed as rail-borne stacking cranes which are also referred to as rail-mounted gantry cranes or RMG for short. Such stacking cranes 7 are typically manually guided or controlled by an operator also travelling in a crane operator's cabin. It is also feasible to have an at least partially or completely automated operation of such stacking cranes 7. In this case, containers are not transferred on the head side but instead on the long side of the storage area 5a and are set down or picked up for being removed from storage and placed into storage respectively by the RMG or RTG. For this purpose, corresponding transfer lanes are provided underneath the gantry of the corresponding stacking crane 7. In this case, a stacking crane 7 can also manage a plurality of storage areas 5a, which are adjacent one another in the longitudinal direction L, which, as seen in the longitudinal direction L, are arranged one behind the other and which are spaced apart from one another in each case by a transverse aisle, and travel over one or a plurality of transverse aisles. Alternatively, each storage area 5a can be allocated a dedicated stacking crane 7 or a plurality of stacking cranes 7.

Within the terminal 1, internal container transport vehicles 8 having a battery-electric travel drive are used for transporting containers between the container store 5 or its handling devices and the handling devices arranged on the quay 2, the vehicles being able to be guided automatically or manually in terms of the above definition. This transport is effected in each case in so-called horizontal transportation. If, in this connection, partially or exclusively automatically guided container transport vehicles 8 are used, a delimited separate operating area in terms of an automatic-area A is established within the terminal 1. In the automatic-area A, exclusively automatically guided container transport vehicles 8, but no manually guided container transport vehicles 8, are allowed to operate between the handling devices at the quay 2 and the part of the store 5 allocated to the automatic-area A. In a corresponding manner, a manual-area B is established for the manually guided container transport vehicles 8, in which no automatically guided container transport vehicles 8 and also no external lorries 8a are allowed to operate. The automatic-area A which adjoins the manual-area B can be established by an inner boundary analogous to the boundary 10 in the form of a fence or a wall. The automatically guided container transport vehicles 8 can be operated in accordance with regulations only within the automatic-area A and only depart from this area for maintenance or repair purposes through an inner passing area similar to the passing area 11 in the direction of the manual-area B. However, in this case, the container transport vehicles 8 do not depart from the automatic-area A in an automatically guided manner and so this is not deemed to be an operation in accordance with regulations. Persons are also allowed to enter the automatic-area A during regular operation only in exceptional cases e.g. for maintenance or repair purposes. The manual-area B is also accessible for authorised personnel only via at least one corresponding passing area 11 within the terminal 1 and otherwise is surrounded by the boundary 10. This also prevents external lorries 8a from driving into the manual-area B. However, manually guided container transport vehicles 8 can depart from the manual-area B in order to ensure a connection of a rail terminal (not illustrated) located within the terminal 1 for rail-borne transport of containers.

Figure 3:
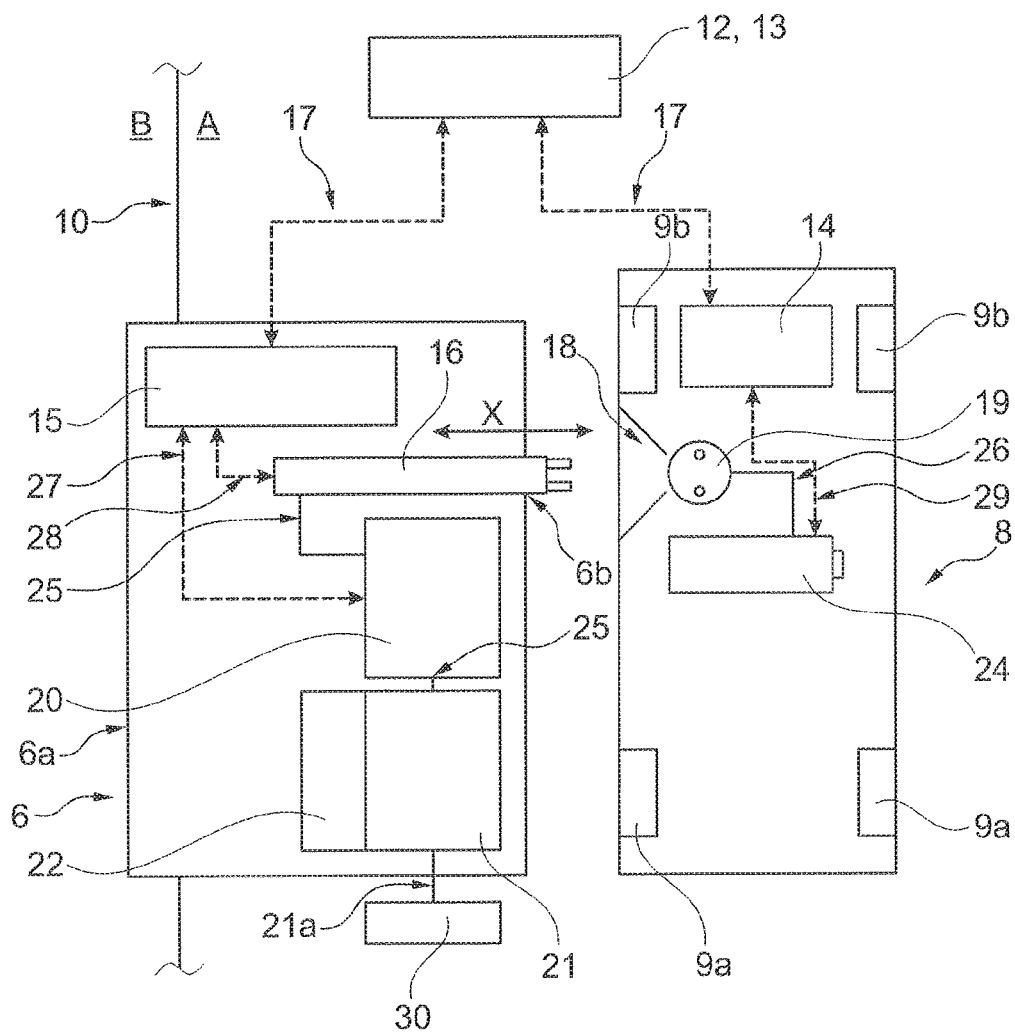
FIG. 3 shows a schematic view of an electric charging station in accordance with the invention with a container transport vehicle in accordance with the invention.

In order to coordinate the traffic within the terminal 1 and in particular within the automatic-area A or manual-area B, a computerised terminal management system 13 is provided together with a fleet management system 12 (see FIG. 3). Transport orders for the container transport vehicles 8 are scheduled, managed and communicated to the fleet management system 12 via the terminal management system 13. The warehousing or management of container store 5 can also be performed by the terminal management system 13 and can influence the scheduling of the transport orders. The transport orders are then used by the fleet management system 12 for coordinating the traffic, in particular the route planning and route monitoring which are performed continuously in this case. In this connection, routes are generated from the transport orders and are communicated to the container transport vehicles 8 via wireless communication connections 17, e.g. in the form of WLAN connections. In the case of automatically guided container transport vehicles 8, the routes are converted by the vehicle controller 14 automatically into corresponding driving manoeuvres in specified lanes. In this connection, steering procedures and speeds as well as accelerations of the container transport vehicle 8 are automatically controlled by means of the vehicle controller 14. In the case of manually guided container transport vehicles 8, the drivers can receive driving instructions via a driver information system of the container transport vehicle 8 and on the basis of the routes, the instructions having to be implemented as corresponding driving manoeuvres by the driver by means of manual engagement of the vehicle controller 14. In order to coordinate the traffic or route planning and route monitoring, the fleet management system 12 performs continuous processing of the time-variable positions of the container transport vehicles 8, which are located in the automatic-area A or manual-area B of the terminal 1, and further operating information such as e.g. the respectively used driving areas, lanes and travel directions of the container transport vehicles 8 and driving speeds and traffic regulations. Routes can also be specified and changed in this case via the fleet management system 12 and the communication connections 17, e.g. by means of target positions specified for specific points in time, storage aisles, lanes and/or travel directions to be used. Moreover, the fleet management system 12 can dynamically block or release areas, in particular individual storage aisles or lanes in terms of exclusion areas, and can thus ensure that only one container transport vehicle 8 is located in a specified area.

Figure 2:
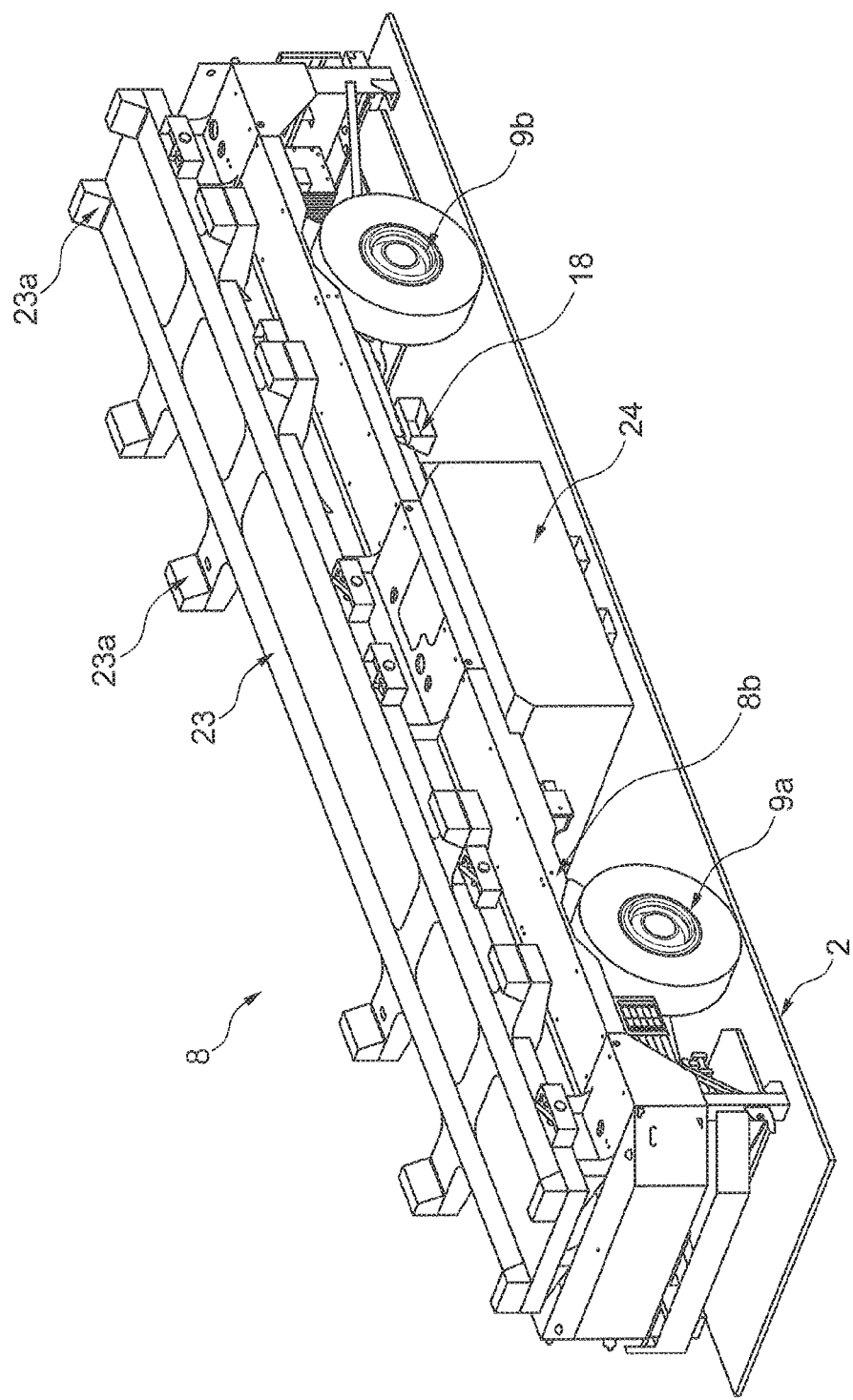
FIG. 2 shows a view of a container transport vehicle.

FIG. 2 shows a schematic view of a container transport vehicle 8 according to an example of a vehicle type. The container transport vehicle 8 has an unloaded weight of about 35 tonnes. Additional thereto is the weight of the ISO container(s) to be transported so that, in the loaded state, a total weight of about 100 tonnes can be achieved. The container transport vehicle 8 has a vehicle frame 8b, on which, on a common front axle, two front wheels 9a and, on a common rear axle, two rear wheels 9b are mounted. By means of the wheels 9a, 9b, the container transport vehicle 8 can move freely on the quay 2 and therefore in a ground-borne but not rail-borne manner. Accordingly, such container transport vehicles 8 are to be distinguished from rail vehicles and in particular railway wagons. The wheels 9 of the container transport vehicles 8 are each provided with a tyre arrangement which is preferably an air-filled rubber tyre arrangement in the sense of tyres. Moreover, if the container transport vehicle 8 is not automatically guided as in FIG. 2, but instead is manually guided, a driver's cabin is provided. Automatically guided container transport vehicles 8 can also have a driver's cabin if a change is provided between automatic operation and manual operation. In this case, a container transport vehicle 8 can also be operated in the above-defined sense in an automatically guided and manned manner in the automatic-area A, wherein the person also travelling in the vehicle does not have to or cannot engage the vehicle controller 14 within the automatic-area A.

A preferably flat loading surface 23 is located on a top side of the vehicle frame 8b and serves to receive the ISO containers, not illustrated, which are to be transported. The size of the loading surface is selected in such a way that, as seen in a longitudinal direction L of the container transport vehicle 8, two 20 foot containers can be transported one behind the other or a 40 foot container or a 45 foot container can be transported. The loading surface 23 can be designed to be passive in the sense of being rigidly connected to the vehicle frame 2 or can be active. In this connection, 'active' is understood to mean that the loading surface as part of a lifting platform can be raised and lowered in a vertical direction and relative to the vehicle frame 8b in order to actively pick up or set down containers. The loading surface 23 can also be divided in order to be able to lift and lower a 20 foot container in each case.

Also illustrated are the guide elements 23a which are already mentioned in the introduction and which are provided in the vehicle type illustrated by way of example in order to be able to guide a container 2, which is to be transported, and in the case of ISO containers in particular its corner fittings when being set down on the loading surface 23, and to be able to orient same in relation to the loading surface 23. For this purpose, the loading surface 23 is delimited on its sides by a plurality of guide elements 23a. The guide elements 23a have guide surfaces which extend in an inclined manner. In this case, the guide surfaces extend in a manner directed upwards and outwards away from the loading surface 23 and extend in a manner directed downwards and inwards towards the loading surface 23. The guide elements 23a are preferably disposed in pairs on opposing sides, in particular long sides and/or short sides, of the loading surface 23. The guide surfaces of one pair of guide elements 23a form a type of funnel, the inclined extension of which tapers towards the loading surface 23 in order to achieve the guiding and orientating function. Accordingly, the guide surfaces of a pair of guide elements 23a widen in the upwards direction away from the loading surface 23. Moreover, the container transport vehicles 8 each have a battery-electric travel drive having a drive motor designed as an electric motor, and a transmission in order to drive the wheels 9a, 9b therewith. The travel drive comprises a rechargeable battery 24 in terms of an accumulator which is designed preferably as a lithium-ion battery. The battery 24 is suspended underneath the vehicle frame 8b from the frame. Typical power contents of the battery 24 can be e.g. between 100 and 300 kWh and typical voltage ranges can be e.g. between 400 and 1000 V.

FIG. 3 shows a schematic view of an electric charging station 6 which is designed in accordance with the invention as a mobile unit, with a container transport vehicle 8 in accordance with the invention in the terminal 1. The electric charging station 6 comprises, as essential components, a charging device 20 and a contacting unit 16 which is connected thereto via an electrical line 25. The contacting unit 16 having electrically conductive contacts can be used to establish an electrical connection to contacts or contact means 19 of the chargeable battery 24—serving as a traction battery—of a container transport vehicle 8 for a charging procedure of the battery 24. For this purpose, the contacting unit 16 is mounted so as to be movable in the retraction and extension direction X. The charging procedure is controlled via the charging device 20 which, for this purpose, comprises a converter, in particular in the form of a charge inverter, inductors and capacitors, mains filter and fuses and the components required for activation purposes. The activation is effected in this case e.g. via a programmable logic controller or PLC for short. By means of the PLC, the communication between the charging device 20 and the battery 24 is established or the charging device 20 is activated on the basis of the communication. Instead of a PLC, an industry-PC can also be used. Together with the entire contacting unit 16 and the charging device 20, the electric charging station 6 is designed as a mobile unit. The charging capacity of the electric charging station 6 can be e.g. between 50 and 500 kW depending upon the connection power and battery size.

As a further component, the electric charging station 6 designed as a mobile unit also comprises, in addition to the contacting unit 16, a connector 21, which is connected to the charging device 20 via an electrical connector line 21a, a control unit 15 and a sub-distribution unit 22. By means of the connector 21, the electric charging station 6 or the charging device 20 can be electrically connected to an electric power supply network 30 of the terminal 1 in order to supply the electrical power required for the charging procedures of the batteries 24. The connection to the power supply network 30 can also be established indirectly via a transformer station in order to step down the voltage of the power supply network 30 from a medium voltage level to a lower voltage level. A plurality of electric charging stations 6 can be connected to such a transformer station. By means of the control unit 15, the electric charging station 6 can be incorporated into the terminal management system 13 or the fleet management system 12 by establishing a wireless communication connection 17, e.g. in the form of a WLAN connection, to the control unit 15. The electric charging station 6 and in particular the control unit 15 can be activated via the communication connection 17. In turn, the control unit 15 can then activate the charging device 20 and the contacting unit 16. For this purpose, further communication connections 27 or 28 are provided between the control unit 15 and the charging device 20 or the control unit 15 and the contacting unit 16, which can be wired or wireless. The contacting unit 16 can also be activated via the charging device 20 if a corresponding communication connection is likewise established therebetween. Further consumers of the electric charging station 6 can be supplied by means of the sub-distribution unit 22.

In order to design the electric charging station 6 as a mobile unit, at least the contacting unit 16 and the charging device 20, but preferably also the aforementioned further components, are arranged completely in a transportable common housing 6a. In the present example, the housing 6a is designed as an ISO container which completely accommodates all of the components of the electric charging station 6. Therefore, no functional elements of the electric charging station 6 are accommodated outside the ISO container. Only the connector 21 can be mounted in the housing wall in the manner of a socket in order to be connected to the connector line 21a. Alternatively, the connector 21 can also be mounted completely within the housing 6a and so the connector line 21a, e.g. in the form of a cable, is guided through the housing wall and connected to the power supply network 30 e.g. via a plug connection. The connector line 21a can be a fixed component part of the electric charging station 6. A plug connection with the connector 21 is also possible.

Moreover, the housing 6a has an opening 6b provided therein, through which the contacting unit 16, after being correspondingly activated for a charging procedure, can be moved in particular automatically by means of a suitable drive. As a result, the contacting unit 16 can dock in an automated manner with a container transport vehicle 8, which stops in the region of the electric charging station 6, or its contact means 19, which are connected to the battery 24 via a battery line 26, for the charging procedure, and can establish the electrical connection for the charging procedure. The connection can be configured as a type of plug-socket connection, wherein the contacting unit 16 corresponds to the plug and the contact means 19 correspond to the socket. Reliable docking is ensured by virtue of the fact that a guide in the form of a funnel 18 is arranged on the container transport vehicle 8, in particular on its long side and preferably on its vehicle frame 8b (see also FIG. 2). The contact means 19 are arranged in the region of the guide such that the contacting unit 16 for a charging procedure of the battery 24 can be captured by the guide and guided to the contact means 19. For this purpose, the funnel 18 is arranged with its wider opening, which serves as a type of capturing device for the contacting unit 16, in a manner directed away from the centre of the vehicle. The narrower opening of the funnel 18 accordingly faces the centre of the vehicle, and the contact means 19 are arranged in the region of the narrower opening. By means of such a guide, tolerances in the positioning of the container transport vehicle 8 in advance of the electric charging station 6, in particular in the longitudinal direction as well as at the height of the container transport vehicle 8 are possible and can be compensated for. For this purpose, the movable contacting unit 16 is designed or mounted accordingly in a flexible and/or pivotable manner. In the transverse direction of the vehicle, tolerances are compensated for by the contacting unit 16 itself, in that it can be moved to different extents in the retraction and extension direction X. After docking via the contacting unit 16, the charging device 20 starts the charging procedure for the battery 24 remaining in the container transport vehicle 8. After terminating the charging procedure, the contacting unit 16 then undocks from the container transport vehicle 8 and is moved back into the ISO container.

The communication connections 17 and the terminal management system 13 or fleet management system 12 ensure that preferably continuous communication takes place between the vehicle controller 14 and the control unit 15. As a result, the vehicle controller 14, which is connected to the battery 24 via a communication connection 29, can monitor, in the manner of a battery management system, the charging state of the battery 24 and can prepare or initiate a charging procedure when the charging state of the battery decreases to a defined charging state. In the case of automatically guided container transport vehicles 8, the vehicle controller 14 registers the container transport vehicle 8 for a charging procedure via the communication connection 17 and receives the information, in particular a corresponding route, which is required for travelling to a free electric charging station 6 in an automatically guided manner. In the case of manually guided container transport vehicles 8, the driver is informed accordingly via the driver information system and is requested to drive to a free electric charging station 6 via a correspondingly specified route. In particular, in the case of smaller fleets of container transport vehicles 8 without a terminal management system 13 or fleet management system 12, the charging state of the battery 24 displayed by a display can alternatively also be monitored by the driver and upon requirement it is possible to drive to a free electric charging station 6 without a specified route. At the same time, the corresponding container transport vehicle 8 is no longer considered for transport orders until completion of the charging procedure, i.e. it does not take part in the normal transport operation until completion of the charging procedure. As part of the preferably continuous communication, provision can also be made that the positioning of the container transport vehicle 8, as required for the charging procedure, is detected at the electric charging station 6, thus initiating the docking at the contacting unit 16 or the extension movement thereof and the subsequent start of the charging procedure. The completion of the charging procedure can be reported e.g. by the control unit 15 and/or the vehicle controller 14 to the terminal management system 13 or the fleet management system 12. Therefore, the electric charging station 6 is available for a new charging procedure and the container transport vehicle 8 is then available to the regular transport operation for transport orders in the terminal 1. As previously described, the terminal management system 13 or the fleet management system 12 can manage or coordinate battery charging orders or even maintenance orders. Preferably, each one of typically a plurality of electric charging stations 6 provided in the terminal 1 is incorporated accordingly for this purpose.

In order to be able to access the electric charging stations 6 provided in the automatic-area A also from outside the automatic-area A, they are incorporated, as illustrated in FIGS. 1 and 3, into the boundary 10, e.g. a correspondingly dimensioned opening in the fence. In the case of such an arrangement, the electric charging station 6 is accessible for maintenance personnel also from the manual-area B and thus from outside the automatic-area A. In particular, the housing 6a can be accessed in this case from the manual-area B through a door located outside the automatic-area A.

It is thus possible to avoid an interruption in the regular operation or danger to persons in the automatic-area A. Basically, the electric charging stations 6 can, however, be parked and operated both within the automatic-area A and also within the manual-area B at suitable installation sites which can be accessed by the container transport vehicles 8, at a distance or at no distance from the boundary 10.

In order to design the electric charging station 6 in accordance with the invention as a mobile unit, the aforementioned components thereof do not have to be accommodated in an ISO container. Alternatively, it is also feasible to accommodate the components in a housing 6*a* which is designed as a non-normed container or other suitable transportable large-volume container having a corresponding opening 6*b*. Also, an arrangement of the electric charging station 6 and at least the contacting unit 22 and the charging device on a vehicle trailer which can be moved via wheels represents an electric charging station designed as a mobile unit. For this purpose, a common housing 6*a* is not required for the components of the electric charging station 6. The vehicle trailer or its loading surface represents, just like a housing 6*a*, a common carrier element, on which at least the contacting unit 16 and the charging device 20 and optionally the possible further components for designing the electric charging station 6 as a mobile unit can be arranged in order to design the electric charging station 6 as a mobile unit and thereby to be able to transport and install the unit in a simple manner between different installation sites. This permits particularly flexible positioning of the electric charging station 6 at alternate installation sites if the power supply network 30 extends to the respectively desired installation site and a facility for connecting to the power supply network 30 of the terminal 1 is provided in order to permit supply via the connector 21.

Instead of the vehicle type illustrated by way of example in the figures, the fleet of container transport vehicles 8 used in the terminal 1 for horizontal transportation can also include trailer trucks having a towing vehicle in the form of a terminal truck or gantry lift devices in terms of the above definition. Heavy-duty lift trucks in the form of so-called reach stackers represent a vehicle type of container transport vehicles 8. Corresponding gantry lift devices as well as heavy-duty lift trucks typically do not have a loading surface 23 with guide elements 23*a* for setting down containers, but instead have a so-called spreader frame as a load picking-up means for picking up containers. Furthermore, these types of vehicles have as common features at least one battery-electric travel drive and a guide for the contacting unit 16 in the above-described sense. The contact means 19 arranged in the region of the guide for the contacting unit 16 can be spaced apart from the battery 24 and can be connected thereto via the electrical battery line 26. As a result, the battery 24 itself can be arranged in the region of the guide or even spaced apart therefrom. This applies in particular if container transport vehicles 8 in the form of gantry lift devices, such as straddle carriers, drive to the electric charging station 6 for a charging procedure. In this case, the battery 24 can then be mounted e.g. in the region of a top frame of the gantry and thus above the contacting unit 16, and the contact means 19 can be arranged in the region of running gear unit carriers of the gantry lift device approximately at the height of the contacting unit 16. Furthermore, the described electric charging station 6 represents a solution which can be universally used in order to be able to recharge the batteries 24 of the container transport vehicles 8 for horizontal transportation. The electric charging station 6 can be automated as described for manually guided container transport vehicles 8 or even can be designed in a manually operable variant. In this case, a driver can manually move the contacting unit 16 for docking with the contact means 19.

Moreover, the container transport vehicles 8 and electric charging stations 6 in accordance with the invention can be used not only in the manner described in the present case in relation to a terminal 1 designed as a port terminal. On the contrary, this is also possible if a corresponding terminal 1 is part of a logistics centre or an industrial operation, in the internal logistics of which container transport vehicles 8 or heavy-duty vehicles having a comparable battery-electric drive are used. Of course, instead of containers, in particular ISO containers, other normed or standardised load carriers, such as swap bodies, in particular swap containers or swap trailers, can also be transported and handled.

The invention is not limited to the embodiment(s) described herein but can be amended or modified without departing from the scope of the present invention, which is intended to be limited only by the scope of the appended claims as interpreted according to the principles of patent law including the doctrine of equivalents.

The invention claimed is:

1. An electric charging station for a container transport vehicle, said electric charging station comprising:
   a charging device;
   a contacting unit connected to said charging device, wherein said contacting unit is configured to establish a direct electrical connection between said electric charging station and electrical contacts of a chargeable battery of a container transport vehicle for a charging procedure of the battery; and
   a mobile housing having said contacting unit and said charging device arranged together therein;
   wherein said electric charging station including said contacting unit and said charging device is configured as a mobile unit that is freely transportable to any desired installation site within a terminal; and
   wherein said mobile housing defines an opening through which said contacting unit is selectively movable out of said mobile housing for a charging procedure.

2. The electric charging station as claimed in claim 1, wherein at least said contacting unit and said charging device are arranged on a common carrier element configured to permit said contacting unit and said charging device to be transported together between different installation sites.

3. The electric charging station as claimed in claim 1, wherein said contacting unit is configured to be moved automatically through said opening of said mobile housing for a charging procedure.

4. The electric charging station as claimed in claim 1, further comprising a connector that is connected to said charging device for connecting said charging device to an electric power supply network or to a control unit for activating said charging device and said contacting unit and for incorporation into a fleet management system.

5. A container transport vehicle comprising a battery-electric travel drive including said chargeable battery with said electrical contacts and a funnel-shaped guide, wherein said electrical contacts are arranged in the region of said guide such that, for the charging procedure of said battery, said contacting unit of said electric charging station as claimed in claim 1 is guided to said electrical contacts by said guide.

6. The container transport vehicle as claimed in claim 5, wherein said container transport vehicle comprises an automatically guided container transport vehicle.

7. The system as claimed in claim 2, wherein said container transport vehicle and said electric charging station are each connected via a communication connection to a terminal management system or a fleet management system in order to coordinate the operation of said container transport vehicle and said electric charging station.

8. The electric charging station as claimed in claim 7, wherein at least said contacting unit and said charging device are arranged on a common carrier element configured to permit said contacting unit and said charging device to be transported together between different installation sites.

9. The electric charging station as claimed in claim 2, wherein said mobile housing comprises an ISO container.

10. The electric charging station as claimed in claim 2, wherein said contacting unit is configured to be moved automatically through said opening of said mobile housing for a charging procedure.

11. The electric charging station as claimed in claim 10, further comprising a connector that is connected to said charging device for connecting said charging device to an electric power supply network or to a control unit for activating said charging device and said contacting unit and for incorporation into a fleet management system.

12. A container transport vehicle comprising a battery-electric travel drive including a chargeable battery with contacts and a funnel-shaped guide, wherein said contacts are arranged in the region of said guide such that, for a charging procedure of said battery, said contacting unit of said electric charging station as claimed in claim 11 is guided to said contacts by said guide.

13. The container transport vehicle as claimed in claim 12, wherein said container transport vehicle comprises an automatically guided container transport vehicle.

14. An electric charging station for a container transport vehicle, said electric charging station comprising:
 a charging device;
 a contacting unit connected to said charging device, wherein said contacting unit is configured to establish a direct electrical connection between said electric charging station and electrical contacts of a chargeable battery of a container transport vehicle for a charging procedure of the battery; and
 a mobile housing comprising an ISO container that is positionable on a vehicle trailer for transport both within the terminal and outside the terminal, said ISO container having said contacting unit and said charging device arranged together therein;
 wherein said electric charging station including said contacting unit and said charging device is configured as a mobile unit that is freely transportable to any desired installation site within a terminal; and
 wherein said ISO container defines an opening through which said contacting unit is selectively movable out of said mobile housing for a charging procedure.

15. A system comprising:
 a container transport vehicle comprising a battery-electric travel drive including a chargeable battery with electrical contacts and a funnel-shaped guide;
 an electric charging station for said container transport vehicle, said electric charging station comprising:
  a charging device;
  a contacting unit connected to said charging device, wherein said contacting unit is configured to establish a direct electrical connection between said electric charging station and said electrical contacts of said chargeable battery of said container transport vehicle for a charging procedure of said battery; and
  a mobile housing having said contacting unit and said charging device arranged together therein;
  wherein said electric charging station including said contacting unit and said charging device is configured as a mobile unit that is freely transportable to any desired installation site within a terminal;
  wherein said mobile housing defines an opening through which said contacting unit is selectively moveable out of said mobile housing for a charging procedure; and
 wherein said electrical contacts are arranged in the region of said guide such that, for the charging procedure of said battery, said contacting unit of said electric charging station is guided to said electrical contacts by said guide.

16. The system as claimed in claim 15, further comprising a terminal in which said at least one container transport vehicle can be operated and in which a plurality of alternative installation sites are provided, at which said at least one electric charging station is connectable to an electric power supply network of said terminal.

17. The system as claimed in claim 16, wherein said container transport vehicle and said electric charging station are each connected via a communication connection to a terminal management system or a fleet management system in order to coordinate the operation of said container transport vehicle and said electric charging station.

\* \* \* \* \*